(12) United States Patent
Bonerz et al.

(10) Patent No.: US 8,259,004 B2
(45) Date of Patent: Sep. 4, 2012

(54) DEVICE FOR MONITORING THE POSITION OF A TOOL OR MACHINE ELEMENT

(75) Inventors: Stefan Bonerz, Marktoberdorf (DE); Josef Greif, Friesenried (DE); Wolfgang Bechteler, Ebenhofen (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 429 days.

(21) Appl. No.: 12/685,899

(22) Filed: Jan. 12, 2010

(65) Prior Publication Data

US 2010/0188282 A1 Jul. 29, 2010

(30) Foreign Application Priority Data

Jan. 23, 2009 (DE) .................... 10 2009 005 745

(51) Int. Cl.
*G01S 13/42* (2006.01)
(52) U.S. Cl. ...... 342/146; 342/175; 700/178; 408/239 R
(58) Field of Classification Search .................. 342/146, 342/175, 52, 61; 137/580, 109, 557; 184/109, 184/55.1; 279/2.12, 62, 137, 2.09, 23.1, 279/4.01, 46.8, 55, 75, 900; 285/272, 98; 409/232–234; 700/178; 403/374.2; 408/239 R, 408/240

See application file for complete search history.

(56) References Cited

U.S. PATENT DOCUMENTS

| | | | |
|---|---|---|---|
| 7,528,768 B2 | 5/2009 | Wakayama et al. | |
| 2008/0027313 A1* | 1/2008 | Shachar | 600/424 |
| 2008/0045391 A1 | 2/2008 | Martens | |
| 2008/0309546 A1 | 12/2008 | Wakayama et al. | |

(Continued)

FOREIGN PATENT DOCUMENTS

DE 4020551 A1 1/1992

(Continued)

OTHER PUBLICATIONS

Won-Jee Chung; Hyo-Gon Kim; Ji-Hun Ju; Silberbauer, L.; , "Development of a measurement system for high-speed spindle displacement," Control, Automation and Systems, 2007. ICCAS '07. International Conference on , vol., no., pp. 2355-2360, Oct. 17-20, 2007.*

(Continued)

*Primary Examiner* — John B Sotomayor
(74) *Attorney, Agent, or Firm* — Martin Fleit; Paul D. Bianco; Fleit Gibbons Gutman Bongini & Bianco PL (57) ABSTRACT

In a device for monitoring the position of a tool or machine element on or in a work spindle or tool chuck, in particular, in a machining apparatus, the work spindle or tool chuck has at least one channel that defines a waveguide, which is suitable for propagating electromagnetic waves, that leads from an external surface of the work spindle or tool chuck to the tool or machine element. At least one radar system is provided and arranged outside the work spindle or tool chuck in such a manner that it is capable of irradiating a radar signal from the outer surface into the channel and or receiving a radar signal reflected back from the channel. The radar signal is connected to a signal-processing device that determines a measure of the position of the tool or machine element relative to the work spindle or tool chuck based on at least one radar signal irradiated into the channel and reflected back from the channel.

15 Claims, 4 Drawing Sheets

U.S. PATENT DOCUMENTS

| | | | |
|---|---|---|---|
| 2010/0018830 A1* | 1/2010 | Krapf et al. | 192/129 A |
| 2010/0106284 A1* | 4/2010 | Krapf et al. | 700/177 |
| 2010/0188282 A1* | 7/2010 | Bonerz et al. | 342/146 |
| 2011/0167970 A1* | 7/2011 | Niehsen et al. | 83/13 |

FOREIGN PATENT DOCUMENTS

| | | |
|---|---|---|
| DE | 4201013 A1 | 7/1993 |
| DE | 19903183 A1 | 8/2000 |
| DE | 19959778 A1 | 6/2001 |
| DE | 10351347 A1 | 7/2004 |
| DE | 102005043038 A1 | 12/2006 |
| DE | 102005033096 A1 | 1/2007 |
| DE | 102007052940 A1 | 12/2008 |
| EP | 1452835 A1 * | 9/2004 |
| EP | 1889685 A1 | 2/2008 |
| WO | 03027709 A1 | 4/2003 |
| WO | WO 2009109250 A1 * | 9/2009 |

OTHER PUBLICATIONS

European Search Report for EP09179089 dated May 6, 2010.

* cited by examiner

DEVICE FOR MONITORING THE POSITION OF A TOOL OR MACHINE ELEMENT

CROSS REFERENCE TO RELATED APPLICATION

This application claims priority under 35 U.S.C. §119 to German Patent Application No. 10 2009 005 745.5 filed Jan. 23, 2009, the entire contents of which are incorporated herein by reference.

FIELD OF THE INVENTION

The invention relates to a device for monitoring the position of a tool or machine element.

BACKGROUND OF THE INVENTION

In machine tools the presence of contaminants on tool contact surfaces can result in a suboptimal clamping of tools. Contaminants can consist, in particular, of metal chips that unavoidably occur in the machining of a workpiece. Consequently, defective machining can result from a tilted position or an axial offset of the tool. This effect is further intensified by the use of long tools. To improve the manufacturing quality and reduce the proportion of rejects, it is desirable to be able to recognize the occurrence of faulty tool clamping before machining begins. Therefore, it has already been suggested that the quality of tool clamping in machine tools be checked by monitoring the planar abutment of the tool.

For machine tools, there is also the need to monitor the position of various machine elements. An example of this is the drive for actuating the tool chuck. A position measurement on an element of this drive is suitable for providing information as to whether or not control commands from the machine controller for loosening or tightening a tool are executed correctly.

DE 103 51 347 A1 describes the monitoring, by means of pressure-sensitive, tension-sensitive or force-sensitive sensor apparatus, of the forces appearing at the chuck of a machine tool. The objective pursued in this case is the simultaneous monitoring of the correct tool tension and the forces appearing during machining, in order to be able to optimize the process parameters during machining For this purpose, the sensors must be integrated into the chuck in such a manner that they are included in the flow of force occurring during machining DE 199 59 778 A1 teaches the use of a telemetry system with a distance-measuring sensor apparatus for simultaneous checking of the clamping state and the planar abutment of the tool on the spindle. The document does not contain any detailed information on the configuration of the sensor apparatus and the telemetry unit, however.

DE 199 03 183 A1 describes a high-frequency distance measuring device with an antenna constructed as a sensor and a waveguide open at one end, the open end of which is terminated with a damping member. A reflective object whose position is to be determined is situated in the vicinity of the damping member. The transmission frequency of the oscillator is regulated such that the arrangement is resonant. The resonant frequency is a measure of the distance of the reflecting object from the damping member. Various applications are suggested, in which the distance sensor is always installed in the interior of a mechanical device, in which a distance measurement is to be performed at one of its components.

The problem of the invention is to create a new and expedient solution that can be easily and economically realized for monitoring the position of a tool or machine element on or in a work spindle or tool chuck, in particular, in a machine tool.

This problem is solved according to the invention by a device with the characteristics of Claim 1. Advantageous configurations are specified in the subordinate claims.

SUMMARY OF THE INVENTION

The invention provides a detection of the position of the tool or machine element of interest by means of irradiating electromagnetic waves into at least one channel constructed in the work spindle or tool chuck and evaluating the signal reflected out of this channel. The influencing of the reflection characteristic by the position of the tool or machine element results from the fact that the channel defines a wave propagation path from an external surface of the work spindle or tool chuck to the tool or machine element of interest, so that in at least one possible position of the tool a part of its surface acts as a reflection surface The distance of this reflection surface from the transmission antenna can be measured according to the radar principle.

In comparison with transponder systems of the known type, the invention makes it possible to completely forgo the arrangement of electronic circuit components in a rotating work spindle or in the interior of a tool chuck, where there is hardly any space available and the access possibilities are very limited. The only modification to the work spindle or tool chuck that is absolutely necessary for realizing the invention is the provision of at least one bore for creating a channel that acts as a waveguide for the irradiated and reflected electromagnetic waves.

Another advantage is that components for radar systems for distance measurement (24 GHz, 60-61 GHz, 76-77 GHz) are commercially available inexpensively from the automobile field. This makes it possible to rely on proven ready-made components as the building blocks of the entire system and reduces the development expense.

In a particularly important embodiment of the invention for checking the planar abutment of a tool or tool carrier on a work spindle, a plurality of channels is required, each ending at a surface at which the work spindle is normally in contact with the tool or tool carrier during operation, so that a deviation of the tool or tool carrier from its correct position results in a shift and/or tilting of the reflection surfaces. Signal processing is simplified in this case because no absolute value measurement of the position of the tool or tool carrier is necessary, but instead, checking the reflection characteristics of the various channels for agreement is sufficient to recognize the correctness of the position.

It is particularly expedient to fill the channel or channels with a dielectric in order to avoid impairment of the waveguide function by penetration of contaminants and chips. The only type of damage that can appear in this case on a rotating part of the sensor apparatus is the pressing of a chip into the dielectric. However, in comparison with repairing an electronic sensor circuit integrated into the work spindle, repairing such damage is easier and more economical. In the case of a position measurement on hydraulic or pneumatic machine elements, such a filling can even be essential, if the element of interest is in a space in which a positive pressure exists at least at certain times.

BRIEF DESCRIPTION OF THE DRAWINGS

Embodiments of the invention will be described below with reference to the appended drawings. Therein.

DETAILED DESCRIPTION OF THE INVENTION

Figure 1:
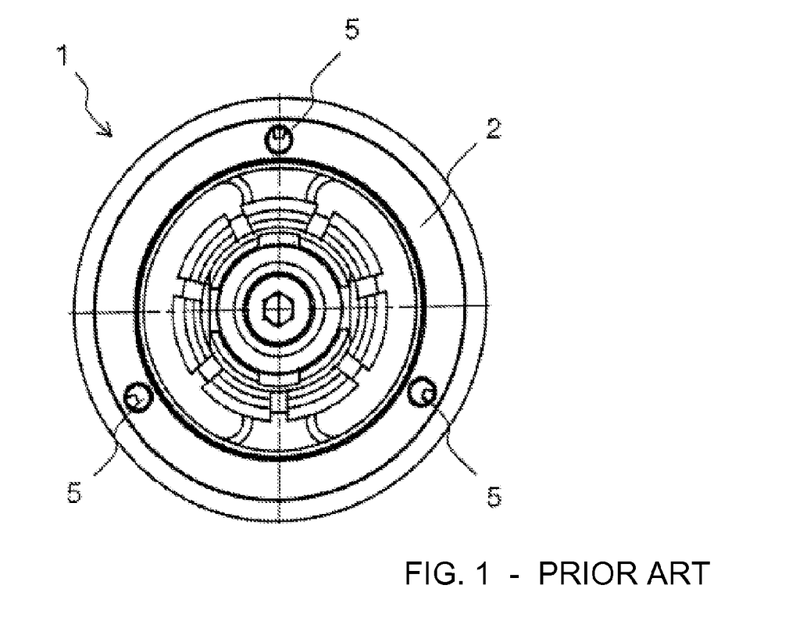
FIG. 1 shows a front view of a work spindle.

FIG. 1 shows the front view of a work spindle 1, which is a component of a machining apparatus, not shown, in particular, a machine tool. On its end face, work spindle 1 has one or more flat contact surfaces 2, against which a tool or tool carrier should lie flat in the clamped state. In case there are several contact surfaces 2, they lie exactly plane-parallel to one another in a single plane. Tools or tool carriers, the latter being able to accommodate various tools, intended for use on work spindle 1 also have matching end-face contact surfaces on their rear side. In case of a planar abutment of the tool-side or tool carrier-side contact surfaces on the spindle-side contact surface 2, the longitudinal axis of the tool or tool carrier runs exactly parallel to the longitudinal axis of work spindle 1. The tool or tool carrier is centered relative to work spindle 1 by conical contact surfaces in the interior of work spindle 1.

If contact surface 2 is contaminated, a planar abutment of the tool or tool carrier on work spindle 1 is no longer possible. Such a contamination can occur particularly due to chips that accumulate during the machining of a workpiece. Such a situation is shown schematically in FIG. 2. A chip 3 that is caught during the clamping of tool 4 on the work spindle 1 between the latter and tool 4 lies on the right part of contact surface 2 and ensures that there is a wedge-shaped gap between the two. If a workpiece is machined with a tool 4 skewed in this manner, one cannot expect a properly dimensioned result, but rather a reject.

According to the invention, several bores 5, three in the illustrated example, of which only the end-face outlet is visible from work spindle 1, are provided on contact surface 2. In the associated longitudinal section in FIG. 3, it is recognizable that, in the interior of work spindle 1, the upper axial bore 5 meets a bore 6 running in the radial direction of work spindle 1. In the same manner, each of the other two axial bores 5, not visible in FIG. 3, meets an associated radial bore 6 in work spindle 1. In the illustrated angular position of work spindle 1, radial bore 6 in work spindle 1 is aligned with radial bore 7 in a locking ring 8 of a stator 9 in which work spindle 1 is seated. A thin air gap 10 that separates rotating work spindle 1 from stator 9 lies between the radial bores 6 and 7.

Figure 3:
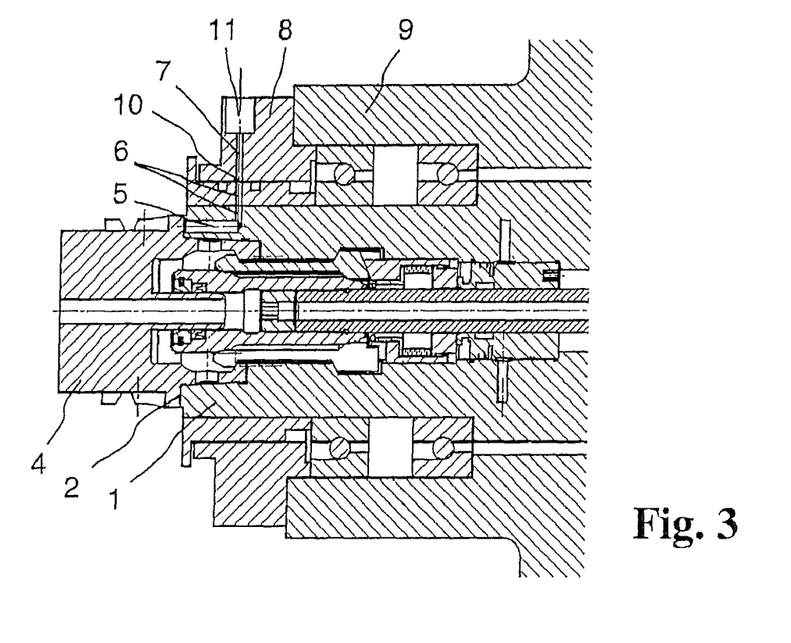
FIG. 3 shows a longitudinal sectional view of a first embodiment of the invention.

A radar system 11 comprising a transmitter, a receiver and an antenna is arranged in a cavity extending from the exterior into locking ring 8 of stator 9. The antenna is oriented towards bore 7 in locking ring 8 in order to allow the irradiation of a radar signal into bore 7 and the reception of a radar signal from bore 7. Like bores 5 and 6, bore 7 functions as a waveguide for an electromagnetic wave irradiated into it. This is sufficiently known from radar technology.

A waveguide allows the guidance of an electromagnetic wave under certain geometrical boundary conditions. A simple bore inside a metal body acts as a waveguide if the wavelength of the electromagnetic wave to be guided is somewhat less than twice the diameter of the bore. In exact terms, the limit wavelength $\lambda_C$ of a round waveguide of diameter D is $\lambda_C=(\pi \cdot D)/1.841$. If a dielectric of permittivity $\in_r$ is present in the waveguide, then the limit wavelength $\lambda_C$ is increased by the factor $\sqrt{\in_r}$. Consequently, the limit frequency of a round waveguide with a diameter of 5 mm is ca. 35.2 GHz with air as the dielectric, and ca. 17.5 GHz when filled with a dielectric with $\in_r=4$. Bores with a diameter on the order of 5 mm can be realized in a work spindle 1 in the area of tool contact under the mechanical boundary conditions. This yields a limit waveguide frequency in a range that is covered by the known technology of frequency-modulated continuous wave radar (FMCW radar).

In the angular position shown in FIG. 3, there is a channel 5, 6, 7 functioning overall as a waveguide between radar system 11 and the rear contact surface of tool 4, with which it rests against contact surface 2 of work spindle 1. A radar signal irradiated by radar system 11 into bore 7 propagates via bore 7, the aligned bore 6 and bore 5 up to the rear contact surface of tool 4, being deflected by 90° at the transition from bore 6 to bore 5. Channel 5, 6, 7 conducts the electromagnetic wave propagating in it in the manner of a waveguide. The radar signal is reflected at the rear contact surface of tool 4 and runs in the opposite direction in channel 5, 6, 7 back to radar system 11, where it is received and output as an electrical signal for further processing.

If channel 5, 6, 7 is filled with a dielectric, as mentioned above, only the limit frequency above which channel 5, 6, 7 acts as a waveguide changes. It is extremely expedient to fill channel 5, 6, 7 with a dielectric, at least in the area of tool-side bore 5, in order to prevent penetration of contaminants and chips, which would obviously interfere with wave propagation. It is preferred, however, to fill the entire channel 5, 6, 7 with a dielectric in order to create homogeneous propagation properties. A potting compound based on polyurethane is particularly suited to this purpose.

Figure 4:
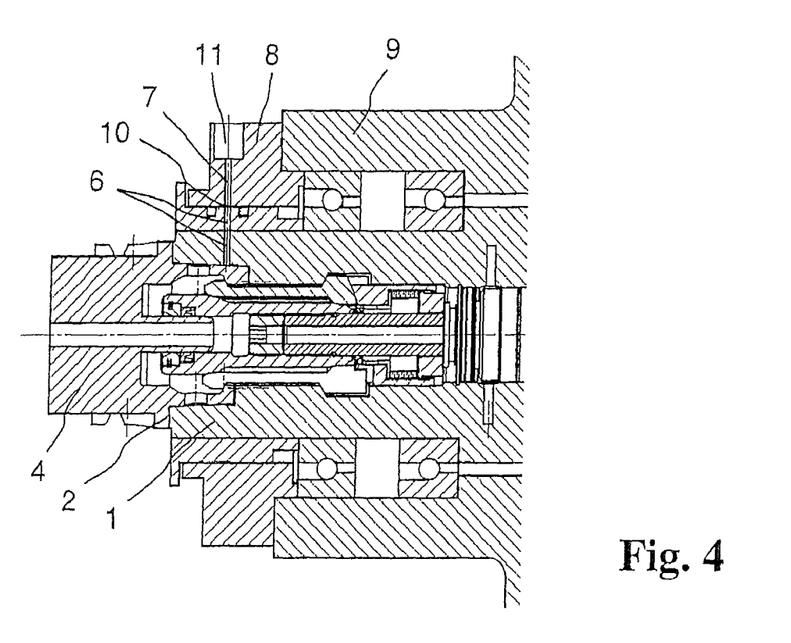
FIG. 4 shows a longitudinal sectional view of a second embodiment of the invention.

FIG. 4 shows an alternative embodiment of a work spindle 1 according to the invention. In contrast to the embodiment according to FIG. 3, no bore 5 in the axial direction is provided in this case; rather, the bore 6 running in the radial direction extends in work spindle 1 up to a conical cavity on the end face, in which a truncated-conical section of tool 4 (or optionally a tool holder) is tightly engaged in the clamped state. This is the only difference from the first embodiment, which is shown in FIG. 3. Identical components in FIGS. 3 and 4 are labeled with identical reference numbers.

The inclination of the outer conical surface of tool 4 with respect to the axial direction of work spindle 1 is ordinarily very slight, and is therefore not recognizable in FIG. 4. The slight inclination of the surface section of tool 4 acting as a reflection surface therefore hardly has an effect on the reflection of the incident wave. To avoid this inclination of the reflection surface, the section of tool 4 that engages with work spindle 1 can be formed cylindrically for a short distance at the level of bore 6, or bores 6 and 7 can run at a corresponding angle of inclination with respect to the radial direction of work spindle 1, so that bore 6 strikes the conical surface of tool 4 at a right angle. The latter variant has the advantage that no modification of tool 4 is required. If necessary, the antenna of radar system 11 can be adapted to the inclined direction of bore 7, i.e., likewise oriented at a slight inclination.

The advantage of the second embodiment as in FIG. 4 is the simpler manufacturing because of the elimination of axial bore 5 and the fact that no deflection of the wave propagation by 90° is necessary. The latter is associated with an undesired partial reflection of the irradiated wave at the deflection point. Neither is the geometric shape of the deflection point freely selectable, but is instead dictated by the tip shape of the drills used to produce bores 5 and 6, so that no optimization of the deflection point to minimize the partial reflection is possible.

Figure 2:
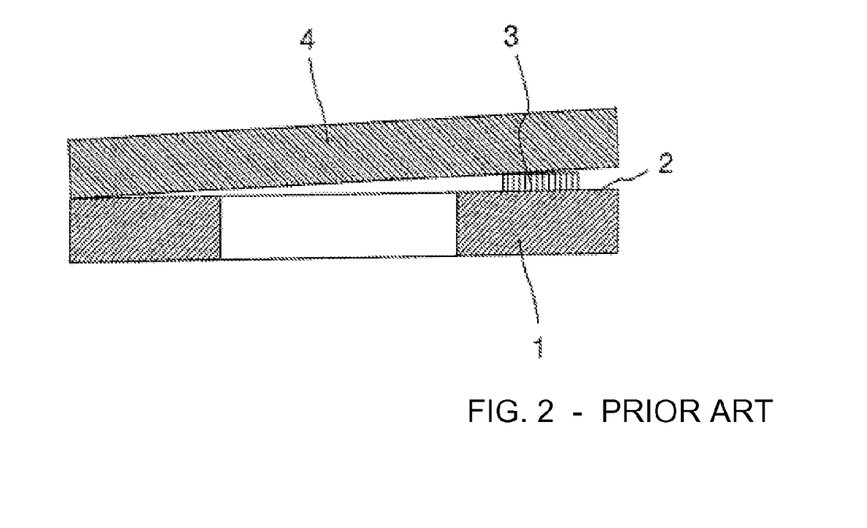
FIG. 2 shows a schematic partial longitudinal sectional view of a faulty tool clamping.

To monitor the planar abutment of the tool, measurements must be taken at several, i.e., at least three, points, preferably uniformly distributed across the end face or the periphery of work spindle 1, and the measurements must be compared with one another to determine whether tool 4 (or a tool holder) is clamped straight or tilted, as in FIG. 2. The latter is expressed in different distances of the reflection surfaces from the tool-side ends of bores 5 of the first embodiment, or of bores 6 in the second embodiment.

To be able to carry out measurements simultaneously at several points, a corresponding number of radar systems 11, i.e., at least three, are needed. In this case, it is not only necessary to provide several bores 5 and/or bores 6 in the work spindle 1, but also a corresponding number of bores 7, each aligned with the bores 6, in locking ring 8 of stator 9, as well as cavities for arranging the radar systems 11. The dimensions for the distances of tool 4 at the individual measuring points are all available at the same time in this case, and can be immediately compared with one another to determine the planar abutment of the tool.

In principle, it is also possible to use only one radar system 11. In this case, a single bore 7 in locking ring 8 of stator 9 that aligns in various predetermined angular positions of work spindle 1 with holes provided therein is sufficient. The different distance measurements must be performed sequentially, and measurement parameters for the respective distances must be temporarily-stored so that a comparison to determine the flat abutment of the tool can be performed after the measurements have been taken at all individual measuring points. One advantage of the use of a single radar system 11 is that statistical variations of the properties of several identical radar systems 11 with respect to one another cannot cause any measuring errors.

To be able to monitor the flat abutment of the tools even during the machining, it is expedient to acquire the angular position of work spindle 1 in order to be able to perform a brief measurement at certain angular positions, namely precisely when the radial bores 6 in work spindle 1 are approximately aligned with radial bores 5 in locking ring 8 of stator 9, or if only a single radar system 11 is used, when one of the bores 6 in work spindle 1 is approximately aligned with the single radial bore 5 in locking ring 8 of stator 9. It is understood that the time window available for a measurement becomes increasingly shorter as the rotational speed of work spindle 1 increases.

At very high rotational speeds of work spindle 1, the available time window can shorten to such an extent that it becomes impossible to perform the distance measurement. In this place the planar abutment can be monitored after a tool change before starting work spindle 1 by first moving work spindle 1 by means of the system controller into the angular position necessary for measurement and stopping it there for the measurement. If only a single radar system 11 is present, then work spindle 1 must be successively moved into several angular positions, in each of which a distance measurement is performed. It is understood that an absolute value measurement of the angular position of work spindle is indispensable for such monitoring of planar abutment with a stationary work spindle 1.

Figure 5:
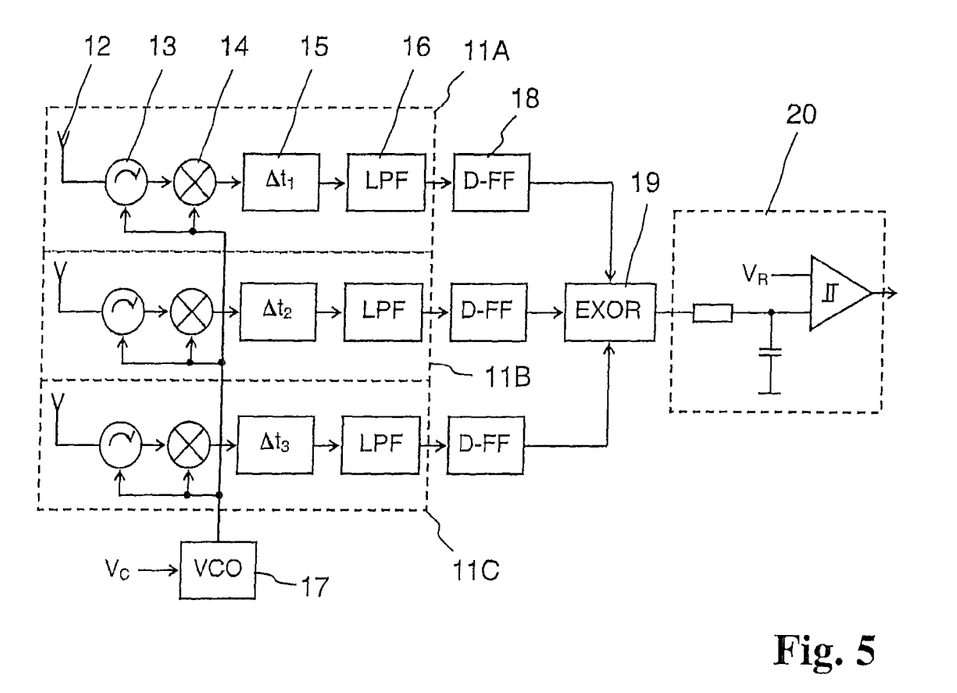
FIG. 5 shows a block schematic electrical circuit diagram of a first evaluation circuit according to the invention.

In the electrical evaluation of the measurement signals, the only thing of importance for the monitoring of planar abutment is the equality of the distances of tool 4 or the tool carrier from the tool-side ends of bores 5 or 6 at the different measurement points. The exact determination of the absolute values of the distances is not necessary, however. One possibility for realizing a comparative measurement of the type of interest here is shown in FIG. 5 in the form of a block schematic diagram, based here on a variant for simultaneous distance measurement with three different radar systems 11A, 11B and 11C.

Radar system 11A has a combined transmission and reception antenna 12 that is connected to a circulator 13. Circulator 13 is connected to one input of a mixer 14. The output of mixer 14 is connected to the input of a delay element 15. The output of the latter is connected to the input of a lowpass filter 16. The output signal of lowpass filter 16 is simultaneously the output signal of radar system 11A. A third terminal of circulator 13 and a second input of mixer 14 are both connected to the output of a voltage-controlled oscillator (VCO) 17, to which a sawtooth-shaped control voltage $V_C$ is supplied to vary its frequency. The three radar systems 11A, 11B, 11C are constructed identically, which is why their components will be explained here only with reference to one system, 11A. The circulators and mixers of the two other systems 11B and 11C are connected in parallel with circulator 13 and mixer 14 of system 11A to VCO 17.

By means of circulator 13, the signal emitted by VCO 17 is fed to antenna 12 as the transmission signal, and the reflection signal received by the antenna is fed to mixer 14. The received signal is demodulated by multiplication by the transmission signal of VCO 17 and filtering by lowpass filter 16, with the relevant information on the distance of the reflection surface from antenna 12 being contained in the phase angle of the demodulated signal. This means that, in case of an equal distance of all three reflection surfaces from the respective antenna, all three radar systems 11A, 11B and 11C would supply identical signals at their output.

Due to unavoidable deviations, however, such as transit time differences between the three systems 11A, 11B and 11C in particular, as well as the three likewise identical but separate waveguide channels 5, 6, 7, or 6,7, the phase angles of the three systems 11A, 11B, 11C would never be identical in practice, even with a perfect planar abutment of tool 4 on work spindle 1. To compensate for these deviations, delay element 15, whose delay time is adjustable, is provided in system 11A. A total of three adjustable delay elements, i.e., one in each of the systems 11A, 11B and 11C, as shown in FIG. 5, offers more degrees of freedom than are necessary to compensate for the transit time differences between systems 11A, 11B and 11C. It is therefore sufficient to adjust a delay time for two of the three delay elements. The delay time of the third can be selected to be zero, or one could do without a delay element in one of the radar systems 11A, 11B, 11C.

The signal processing for comparing the three obtained distance measuring signals consists according to FIG. 5 in the digitization of each of these signals by a respective D-flipflop 18, a linking of the digitized signals in an XOR gate 19, and a subsequent comparison of the output voltage of the XOR gate to an adjustable voltage threshold $V_R$ in a comparator circuit 20 whose output signal finally indicates or not whether there is a correct planar abutment of tool 4 on work spindle 1. While the delay elements could also be adjusted in the open state, i.e., without a clamped tool, the threshold voltage $V_R$ is set in every case with a tool clamped, having a perfect planar abutment on work spindle 1.

Figure 6:
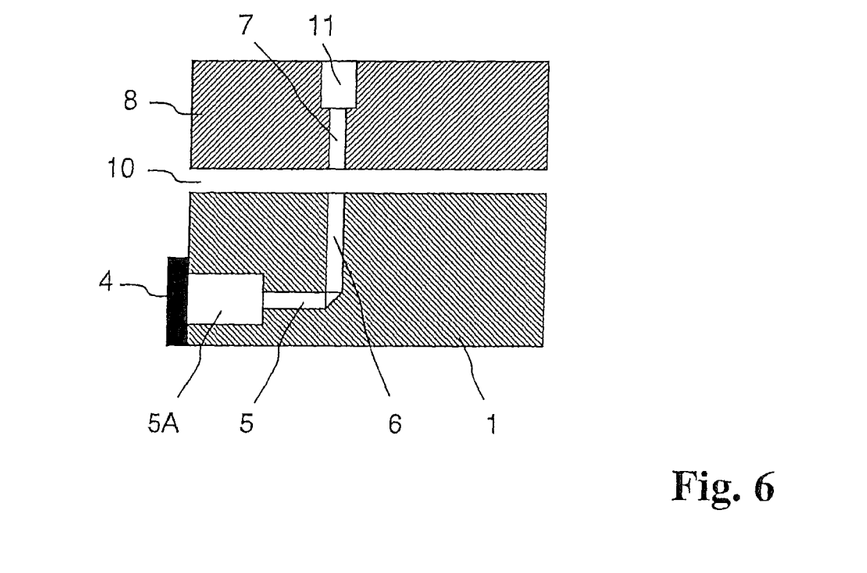
FIG. 6 shows an enlarged longitudinal sectional view of a cutout of a third embodiment of the invention.

Another embodiment of the invention, which uses a different type of distance measurement than that by means of the phase angle of a reflected radar signal, is shown in FIG. 6, wherein the illustration corresponds to a cutout of the upper left-hand area of FIG. 3. Identical components in FIG. 6 are therefore labeled with the same reference numbers as in FIG. 3. Unlike the first embodiment according to FIG. 3, the power output by radar system 11 into the channel 5, 6, 7 functioning as a waveguide, or the reflection coefficient, is used as a measure of the distance of the reflection surface in this case.

To increase the sensitivity, it is expedient here to shape bore 5 in such a manner that as pronounced a resonance as possible appears, which is shown schematically in FIG. 6 by the enlargement of bore 5 at its tool-side end into a chamber 5A. In this manner, a resonant circuit of high quality can be realized, whose resonant frequency depends on the position of the rear contact surface of tool 4 with respect to work spindle 1. It is understood that, in the design of this resonant circuit, it is necessary to take into account, in addition to bores 5, 6, 7 and chamber 5A, the influence of the air gap 10 between locking ring 8 of the stator and the rotating work spindle 1, at which gap the mutually aligned bores 6 and 7 terminate. By only a slight deviation of the position of tool 4 from a perfect planar abutment on contact surface 2 of work spindle 1, such a resonant circuit is detuned, which is easily detectable.

Figure 7:
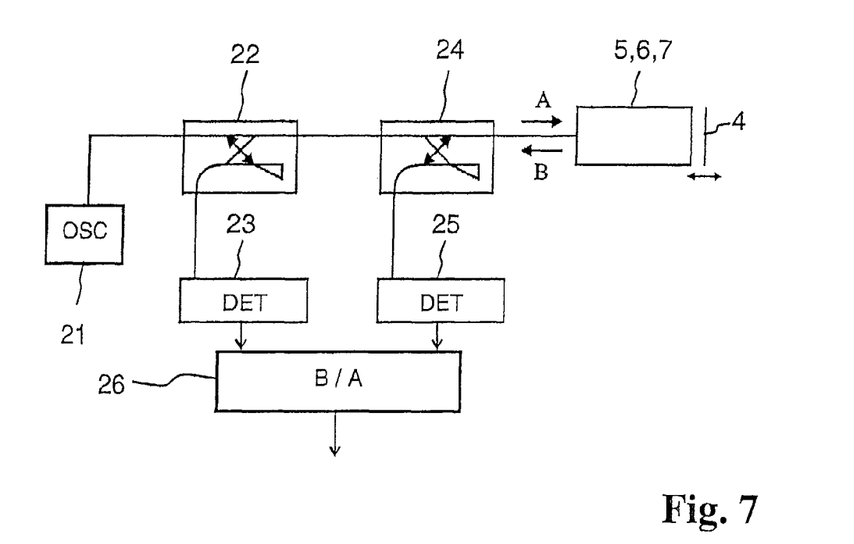
FIG. 7 shows a block schematic electrical circuit diagram of a second evaluation circuit according to the invention.

A suitable circuit arrangement for this is shown in FIG. 7. To determine the coefficient of reflection, the ratio of the power of the reflected signal to that of the transmitted signal must be known. A defined portion of the signal emitted by an oscillator 21 is coupled out via a first directional coupler 22 and supplied to a first detector 23. The remaining part of the signal emitted by the oscillator is irradiated via an antenna, not shown in FIG. 7, into channel 5, 6, 7 functioning as a waveguide and is reflected from tool 4 at the end of the channel, i.e., the end of chamber 5A, which forms the termination of bore 5. A defined part of the reflected signal B is coupled out by a second directional coupler 24 and supplied to a detector 25.

Detectors 23 and 25 emit measurement signals, each representing measures of the power of the signal irradiated into channel 5, 6, 7 and that of the signal reflected out of channel 5, 6, 7. The ratio of the two signals, which assumes an extreme value in case of resonance, is formed in an evaluation unit 26. As in the previously described circuit according to FIG. 5, a calibration must be performed here as well. In this case, the frequency of oscillator 21 is adjusted with a perfectly planar abutment of tool 4 on contact surface 2 of work spindle 1 in such a manner that resonance occurs. In case of a positional deviation by tool 4, there is a great change in the ratio of the two measurement signals. This ratio is compared to an adjustable threshold value in a comparator contained in evaluation unit 26. Finally, a deviation above or below this threshold value indicates whether or not the planar abutment of tool 4 on work spindle 1 is correct.

Although the agreement of the absolute position of tool 4 with a target position is measured, and a single measurement point provides an indication of the correctness of the tool position, several measurement points can be provided to increase the reliability. This implies a multiplication of the entire circuit shown in FIG. 7, as well as the additional provision of a common evaluation unit that receives the output signals of the individual evaluation units 26 and assesses them jointly.

Figure 8:
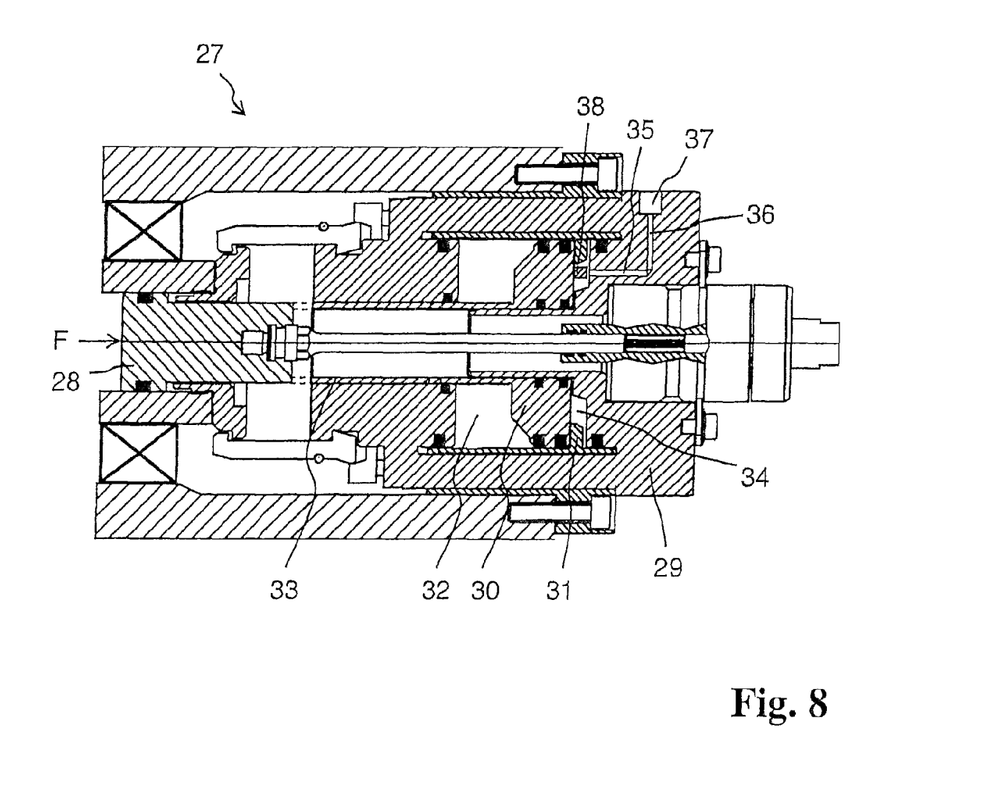
FIG. 8 shows a longitudinal sectional view of a fourth embodiment of the invention.

The applicability of the present invention is by no means limited to the monitoring of the planar abutment of the tool. The functionally relevant positions of various machine elements of a machining apparatus may be measured and monitored instead. FIG. 8 shows an example of this. Therein part of tool chuck 27 for clamping a tool or tool carrier onto or in a work spindle of a machining apparatus is shown in the clamped position. In this position, a disk spring assembly, not shown, exerts a force F onto a movably seated tension rod 28, of which FIG. 8 shows only the back end facing away from a tool holder, not shown, and holds tension rod 28 in the position shown in FIG. 8. A mechanical coupling between tension rod 28 and the collet segments of the tool holder in this position ensures the clamping of a tool or tool carrier in the tool holder.

A hydraulic cylinder 29 with an annular interior, in which an annular piston 30, the so-called tool release piston 30, is seated, is arranged axially adjacent to the end of tension rod 28. In the clamped position, as shown in FIG. 8, tool release piston 30 is situated at the rear end of its range of motion and contacts a stop 31 with its rear end face. An anterior chamber 32 in hydraulic cylinder 29 is filled in this case with a fluid under pressure and presses tool release piston 30 against stop 31. Tool release piston 30 has a hollow cylindrical section 33 extending in the direction of tension rod 28, but is separated from the rear end of tension rod 28 in this position of tool release piston 30.

To release the tool or tool carrier, tool release piston 30 is shifted in the axial direction against tension rod 28 with respect to the clamped position of FIG. 8 by the filling of a rear chamber 34 in hydraulic cylinder 29 with a fluid under pressure, so that the front end of hollow cylindrical section 33 of tool release piston 30 is in contact with the rear end of tension rod 28 and exerts a counterforce on tension rod 28 against the force F from the disk spring assembly. This movement of the hollow cylindrical section 33 is indicated by dash lines in FIG. 8. Tension rod 28 is moved in this manner axially with respect to the clamped position of FIG. 8, specifically, to the left in the representation of FIG. 8, whereby the collet segments release the tool or tool carrier and an exchange of tools becomes possible.

Since tension rod 28 turns when the work spindle is in operation but tool release piston 30 is stationary, it is of interest to monitor the position of tool release piston 30, in particular to determine whether or not it is in the end position according to FIG. 8 and thus separated from tension rod 28. The reaching of said end position by tool release piston 30 is a secure indication of the existence of a clamped condition in which the work spindle can be re-started after an exchange of tools.

According to the invention, a channel composed of a bore 35 running in the axial direction and a bore 36 running in the radial direction is provided in hydraulic cylinder 29. Bore 36 ends in a cavity that is formed on the outer side of hydraulic cylinder 29. Bores 35 and 36 correspond in function to bores 5 and 6 in the embodiment shown in FIGS. 3 and 4, i.e., they act as waveguides for a radar signal that is irradiated from a radar system 37 installed in a cavity on the outside of hydraulic cylinder 29 and is reflected at the rear side of tool release piston 30. To allow a pressure buildup in chamber 34, channel 35, 36 is filled with a dielectric at least in the area of bore 35, but preferably completely.

In order to create a reflection surface as close to the end of bore 35 as possible, a projection 38 extends in the direction of bore 35 from the rear side of tool release distance 30 in the area facing bore 35. This projection 38 covers bore 35 with a surface perpendicular to the axis of bore 35 that is only a very small distance away from the end of bore 35 in the position of tool release piston 30 as shown, or directly contacts the hydraulic cylinder. In the latter case, the contact of projection 38 with hydraulic cylinder 29 limits the motion of tool release piston 30 to the rear and replaces the stop 31, which is then no longer needed. Then, however, projection 38 should have a radially symmetrical shape relative to the axis of tool release piston 30 to guarantee a radially symmetrical force distribution in the rear-side support of tool release piston 30.

It is evident that by irradiating a radar signal into channel 35, 36 and measuring the signal reflected from projection 38, the position of tool release piston 30 can be measured and it can be determined, in particular, whether or not it is in the end position shown in FIG. 8, which corresponds to the clamped position of the tool chuck. In this application of the invention, the difference between the positions of the reflection surface in the two end positions of tool release piston 30, i.e., the rear end position shown in FIG. 8 and the front end position, which corresponds to the release position of the tool chuck, is considerably larger than in the previously described monitoring of the planar abutment of a tool, in which a minimal tilting of the tool must be recognized. The precision requirements placed on the radar distance measurement are therefore considerably less in this application.

Here as well, a phase measurement like that on which the circuitry of FIG. 5 is based, or a measurement of the reflection coefficient corresponding to the circuit of FIG. 7, can be considered as measuring methods. In contrast to the circuit according to FIG. 5, however, the comparison between the signals of several measuring points is omitted. For measuring the reflection coefficient, it is possible here as well for the end of bore 35 to be expanded into a chamber of the appropriate shape, analogously to the embodiment of FIG. 6, to form a waveguide resonator and create a resonant circuit operated in resonance, which is detuned by a removal of tool release piston 30 from its rear end position.

Various possibilities for modifications of the invention follow from the description above for a person skilled in the art. Thus, tool release piston 30 is not the only machine element in the vicinity of a work spindle 1 or a tool chuck 27 whose position can be measured using the present invention. For example, the position of tightening rod 28 can also be monitored, for which a channel functioning as a waveguide and a radar system at a suitable other position can be provided. It is also not absolutely necessary that one of the bores extend in the radial direction relative to the axis of work spindle 1 or tool chuck 27; instead only one bore in a purely radial direction could suffice, depending on the mechanically and functionally determined shapes of the elements through which the radar signal must be guided. Whether the object whose position is to be determined is the tool itself or a tool holder designed to accommodate the tool plays no part in the application of the invention for monitoring the planar abutment of a tool. In the monitoring of the clamping state of the tool, whether the movement of the tightening rod 28 is driven hydraulically as shown in FIG. 8 or pneumatically or electrically also plays no part in the application of the invention. Such modifications and comparable ones are comprised within the protection of the claims.

The invention claimed is:

1. Device for monitoring the position of a tool (4) or machine element (30) on or in a work spindle (1) or a tool chuck (27), in particular in a machining apparatus, wherein the work spindle (1) or tool chuck (27) has at least one channel (5, 6, 7' 35, 36) that defines a waveguide for propagating electromagnetic waves that leads from an outer surface of work spindle (1) or tool chuck (27) to tool (4) or machine element (30), and in that at least one radar system (11; 37) is provided and arranged outside work spindle (1) or tool chuck (27) in such a manner that it is capable of irradiating a radar signal from the outer surface into channel (5, 6, 7; 35, 36) and of receiving a radar signal reflected back out of channel (5, 6, 7; 35, 36), and in that radar system (11; 37) is connected to a signal-processing device (18, 19, 20; 26) that determines a measure of the position of tool (4) or machine element (30) in relation to work spindle (1) or tool chuck (27) based on at least one radar signal irradiated into channel (5, 6, 7; 35, 36) and reflected out of channel (5, 6, 7; 35, 36).

2. Device according to claim 1, wherein the radar system (11) is capable in at least one predetermined angular position of work spindle (1) of irradiating a radar signal and receiving a reflected radar signal.

3. Device according to claim 1, wherein the work spindle (1) has a plurality of channels (5, 6, 7), each ending at a surface (2) at which work spindle (1) is in contact with tool (4) or a tool carrier in the case of proper tool clamping, and in that signal-processing device (18, 19, 20) determines a measure of the position of tool (4) or the tool carrier relative to surface (2) based on a comparison of the radar signals reflected from the different channels (5, 6, 7) or signals derived therefrom.

4. Device according to claim 3, wherein at least three channels (5, 6, 7) are arranged distributed across the end face and/or the periphery of work spindle (1).

5. Device according to claim 3, wherein several identical radar systems (11A, 11B, 11C) are provided and arranged in such a manner that, in at least one predetermined angular position of work spindle (1), radar signals can be irradiated simultaneously and received simultaneously at several channels (5, 6, 7).

6. Device according to claim 3, wherein only a single radar system (11) is provided that is arranged in such a manner that radar signals can be irradiated and reflected signals can be received at different channels (5, 6, 7) in succession in predetermined angular positions of work spindle (1), in that signal processing device (18, 19, 20; 26) has a memory in which received reflected signals or signals derived therefrom are stored, and in that the comparison of the radar signals reflected from the different channels (5, 6, 7) or of signals derived therefrom is performed using signals stored in the memory.

7. Device according to claim 2, wherein signal-processing device (18, 19, 20; 26) is connected to a measuring device that emits a signal indicating the angular position of work spindle (1) and in that signal-processing device (18, 19, 20; 26) determines the measure of the position of tool (4) relative to work spindle (1) whenever this signal indicates the presence of the predetermined angular position.

8. Device according to claim 2, wherein at least one channel (5, 6, 7) comprises at least one section (7) in a stationary machine element (8) and at least one section (6, 7) in the rotating machine spindle (1), which are aligned with one another at least in a predetermined angular position of work spindle (1).

9. Device according to claim 1, wherein the at least one channel (5, 6, 7; 35, 36) is filled with a dielectric at least along part of its length starting from the end from which the reflected radar signal propagates into channel (5, 6, 7; 35, 36).

10. Device according to claim 1, wherein the at least one channel (5, 6, 7; 35, 36) consists of at least two bores (5, 6; 35, 36) of different directions, of which at least one bore (6; 36) has a radial component relative to the axis of work spindle (1) or tool holder (27).

11. Device according to claim 1, wherein the phase angle of the output signal of the at least one radar system (11) depends on the distance of a surface of tool (4) or machine element (30) from the antenna (12) of radar system (11).

12. Device according to claim 11, wherein several identical radar systems (11A, 11B, 11C) are provided, the outputs of which are respectively connected to the input of a D-flipflop (18), in that the outputs of D-flipflop (18) are connected to the inputs of an XOR gate (19) and in that the output of XOR gate (19) is connected to the input of a comparator circuit (20).

13. Device according to claim 1, wherein the channel (5, 6, 7; 35, 36) is designed as a waveguide whose resonant frequency depends on the distance of a surface of tool (4) or machine element (30) from its end.

14. Device according to claim 13, wherein a device for acquiring and evaluating the reflection coefficient appearing upon irradiation of a radar signal into channel (5, 6, 7; 35, 36) is provided; which device comprises two directional couplers (22, 24) for coupling out a defined portion of the irradiated and reflected radar signals, two detectors (23, 25) for measuring the outcoupled signal components, each connected to a respective directional coupler (22, 24), and a signal processing device (26) connected to the two detectors (23, 25) that determines the reflection coefficients from the output signals of the two detectors (23, 25) and compares them with a threshold value.

15. Device according to claim 1, wherein the machine element (30) is an actuation member whose movement effects the releasing or clamping of tool (4) or a tool holder in a tool carrier.

\* \* \* \* \*